United States Patent [19]

Yoshinaga et al.

[11] Patent Number: 5,268,783
[45] Date of Patent: Dec. 7, 1993

[54] LIQUID CRYSTAL DEVICE INCLUDING A POLYMER HAVING A SURFACE ENERGY OF AT MOST 25 DYN/CM, DISPLAY APPARATUS USING SAME AND DISPLAY METHOD USING SAME

[75] Inventors: Kazuo Yoshinaga, Machida; Yomishi Toshida, Yokohama; Toshikazu Ohnishi, Machida; Koichi Sato, Yamato; Takeo Eguchi, Atsugi; Tsuyoshi Shibata, Yokohama, all of Japan

[73] Assignee: Canon Kabushiki Kaisha, Tokyo, Japan

[21] Appl. No.: 857,274

[22] Filed: Mar. 25, 1992

[30] Foreign Application Priority Data

| Mar. 26, 1991 | [JP] | Japan | 3-084544 |
| Mar. 26, 1991 | [JP] | Japan | 3-084546 |
| Mar. 10, 1992 | [JP] | Japan | 4-086170 |

[51] Int. Cl.[5] .............................................. G02F 1/133
[52] U.S. Cl. ..................................... 359/103; 359/51; 359/52
[58] Field of Search ............... 359/51, 52, 99, 103; 252/299.01, 299.6

[56] References Cited

U.S. PATENT DOCUMENTS

| 4,101,207 | 7/1978 | Taylor | 359/51 |
| 4,435,047 | 3/1984 | Fergason | 359/51 |
| 4,707,080 | 11/1987 | Fergason | 359/51 |
| 4,798,680 | 1/1989 | Nohira et al. | 252/299.01 |
| 4,850,683 | 7/1989 | Kawaguchi et al. | 359/51 |
| 4,873,018 | 10/1989 | Nohira et al. | 252/299.01 |
| 4,939,003 | 7/1990 | Aoki et al. | 359/75 |
| 5,056,898 | 10/1991 | Ma et al. | 359/103 |
| 5,089,904 | 2/1992 | Fergason | 359/52 |

FOREIGN PATENT DOCUMENTS

| 0275999 | 7/1988 | European Pat. Off. . |
| 4005869 | 9/1990 | Fed. Rep. of Germany . |
| 0001511 | 2/1991 | PCT Int'l Appl. . |

OTHER PUBLICATIONS

Doane et al., "Wide-Angle-View DDLC Display", SID 90 Digest 224:226.
Fox et al., "The Spreading of Liquids on Low Energy Surface", J. Colloid Sci. (1950) vol. 5, 514:31.
Shibaev et al., "Thermotropic Liquid Crystalline Polymers", Polymer Communications (1983) vol. 24, No. 12, 364:5.

Primary Examiner—William L. Sikes
Assistant Examiner—Huy Mai
Attorney, Agent, or Firm—Fitzpatrick, Cella, Harper & Scinto

[57] ABSTRACT

A liquid crystal device is constituted by disposing a display layer between a pair of electrode plates. The display layer comprises a polymer having a surface energy of 25 dyn/cm or below and a low-molecular weight mesomorphic compound incompatible with the polymer. The display layer also comprises a porous film material having open pores and a low-molecular weight mesomorphic compound impregnating the porous film material, wherein the porous film material has a surface energy of 25 dyn/cm or below and is incompatible with the low-molecular weight mesomorphic compound.

6 Claims, 3 Drawing Sheets

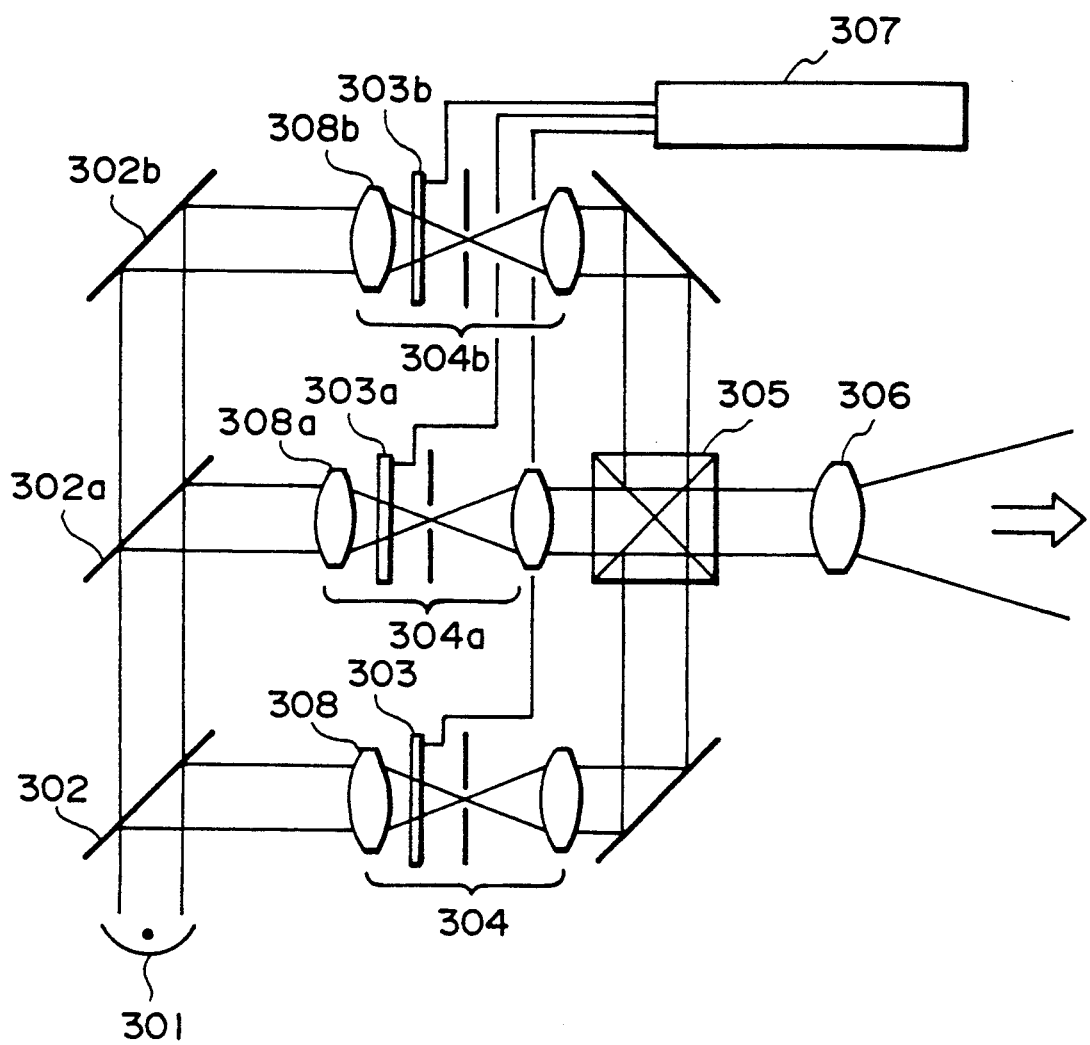
F I G. 3

LIQUID CRYSTAL DEVICE INCLUDING A POLYMER HAVING A SURFACE ENERGY OF AT MOST 25 DYN/CM, DISPLAY APPARATUS USING SAME AND DISPLAY METHOD USING SAME

FIELD OF THE INVENTION AND RELATED ART

The present invention relates to a thermo-optical and electro-optical display device, particularly to a liquid crystal device containing a display layer comprising a specific polymer or porous film material having open pores and a low-molecular weight mesomorphic compound, a display apparatus using the device and a display method using the device.

Liquid crystal materials have been used for various thermo-optical and electro-optical display devices. These display devices have now been actively developed because of a low driving voltage and low energy consumption. One technical problem of these devices is found in providing a display device of a large area.

In order to product a display device of a large area easily, it is considered suitable to use a polymeric or polymer liquid crystal. As an example of a liquid crystal display system using a polymeric liquid crystal, it is possible to raise a polymeric liquid crystal display device of a thermal writing-type as disclosed in Polymer Communications, Vol. 24, p.p. 364-365, "Thermotropic Liquid Crystallization Polymers 14" by V. Shibaev, S. Kostromin, N. Plate, S. Ivanov, V. Vestrov and I. Yakovlev.

The above-described system, however, involves several problems such as poor contrast because of the use of light scattering for readout and a delay in response accompanying the use of a polymeric liquid crystal, so that it has not been put to practical use.

In addition to the above, there have been some proposals for easily producing liquid crystal devices of a large area.

For example, U.S. Pat. No. 4,435,047 to Manchester R & D Partnership discloses a liquid crystal device containing an encapsulated low-molecular weight mesomorphic compound (or liquid crystal) dispersed in polyvinyl alcohol as a polymer matrix. Further, U.S. Pat. No. 4,707,080 discloses a liquid crystal device containing a low-molecular weight mesomorphic compound in a connected tubular form dispersed in a polymer matrix. There has also been reported a liquid crystal device containing a low-molecular weight mesomorphic compound dispersed in a polymer liquid crystal used as a polymer matrix (J. W. Doane, J. L. West, J. B. Whitehead, Jr., D. S. Fredley, "Wide-Angle-View PDLC Displays", 1990 Society for Information Display International Symposium Digest of Technical Papers, Lecture No. 12, 5, p.p. 224-226, May (1990)). The above device has been reported to provide improvements in a viewing angle and a scattering degree.

The above-mentioned devices suitable for easily providing liquid crystal devices of a large area have faster response speeds than those of the conventional devices containing a nematic or cholesteric polymer liquid crystal.

However, the above-mentioned devices containing the low-molecular weight liquid crystal dispersed and held in the polymer matrix had an insufficient interfacial alignment-controlling force, so that it was difficult to obtain a desirable threshold voltage for matrix driving. As a result, the devices have a drawback in providing a high resolution system although it could provide a large area. Further, as an optical modulation principle, the devices utilizes scattering due to a difference in refractive index between the low-molecular weight liquid crystal and the polymer matrix, but it has been difficult to obtain a sufficient refractive index difference. As a result, the devices require considerably thick display layers for effecting sufficient cut-off of light and for Providing high contrast. The devices further involve a problem that it is difficult to effect gradation display. This is because the interface between the polymer matrix and the low-molecular weight mesomorphic compound is in an unstable state, hysteresis with respect to light transmittance is observed when an applied voltage is changed upward and downward.

SUMMARY OF THE INVENTION

The present invention has been accomplished in order to remedy the above-mentioned drawbacks of the conventional liquid crystal devices.

An object of the present invention is to provide a large-area liquid crystal device capable of effecting display with a high contrast, a good threshold characteristic and no hysteresis.

Another object of the present invention is to provide a display apparatus and a display method employing the liquid crystal device described above.

According to the present invention, there is provided a liquid crystal device, comprising: a pair of electrode plates and a display layer disposed therebetween comprising a polymer having surface energy of 25 dyn/cm or below and a low-molecular weight mesomorphic compound incompatible with the polymer.

According to the present invention, there is also provided a liquid crystal device, comprising: a pair of electrode plates and a display layer disposed therebetween comprising a porous film material having open pores and a low-molecular weight mesomorphic compound impregnating the porous film material, wherein the porous film material has a surface energy of 25 dyn/cm or below and is incompatible with the low-molecular weight mesomorphic compound.

The present invention provides a display apparatus, including: any one of the liquid crystal devices described above, means for emitting light, means for applying voltage to the device, and means for separating the light into transmitted light and scattered light.

The present invention also provides a display method, comprising: illuminating anyone of the liquid crystal device described above with light and effecting display by separating the light into transmitted light and scattered light.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is an explanatory view of a display apparatus employing the liquid crystal device according to the present invention.

DETAILED DESCRIPTION OF THE INVENTION

Hereinbelow, the present invention will be explained in detail with reference to the drawings.

Figure 1:
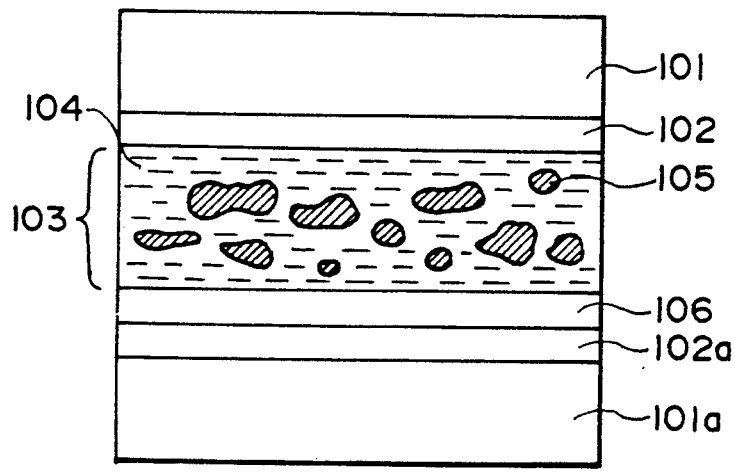
FIG. 1 is a schematic sectional view showing an embodiment of the liquid crystal device according to the present invention.

FIG. 1 is a schematic sectional view of an embodiment of the liquid crystal device of the present invention for explanation of the structure thereof.

Referring to FIG. 1, the liquid crystal device includes a display layer 103 comprising a low-molecular weight mesomorphic compound 105 and a polymer 104 having a surface energy of 25 dyn/cm or below. The display layer 103 is disposed between a pair of substrates 101 and 101a each having thereon an electrode 102 or 102a and further having an adhesive 106 on the electrode 102a.

Each of the substrates 101 and 101a may comprise glass or plastics, e.g., in the form of plate or film.

Examples of a polymer film used as the substrate may include: a low-density polyethylene film, a high-density polyethylene film (such as "Hibron", a product of Mitsui Toatsu Kagaku K.K.), a polyester film (such as "Torefan", a product of Toray K.K.), a polyester film (such as "Myler", a product of Du Pont), a polyvinyl alcohol film (such as "Hicellon", a product Nihon Gosei Kako K.K.), a polyamide film (such as "Rayfan", product of Toyo Gosei Film K.K.), a polycarbonate film (such as "Teijin Panlight", a product of Teijin K.K.) a polyimide film (such as "KAPTON", a product of Du Pont), a polyvinyl chloride film (such as "Hishilex", a product of Mitsubishi Jushi K.K.), a polytetrafluoroethylene film (such as "Teflon", a product of Mitsui Fluorochemical K.K.), a polyacrylate film (such as "Sumilate", a product of Sumitomo Bakelite K.K.), a polystyrene film (such as "Styrosheet", a product of Asahi Dow K.K.), a polyvinylidene chloride film (such as "Saran Film", a product of Asahi Dow K.K.), a cellulose film, a polyvinylidene fluoride film (such as "Tedler", a product of Du Pont) and a polyethersulfone film (such as "Sumilite" a product of Sumitomo Bakelite K.K.).

The electrodes 102 and 102a formed on the substrates may include a transparent electrode comprising ITO (indium-tin-oxide) or $SnO_2$, and a metal film comprising Al, Au, Ag, Cu or Cr. It is possible to use the electrodes as an electrode and a reflective layer in a reflection-type display device. The thus prepared substrates with the electrodes may be inclusively referred to herein as "electrode plates".

In the present invention, the display layer 103 disposed between the electrode plates comprises a specific polymer 104 and a low-molecular weight mesomorphic compound 105, which is incompatible therewith. The thickness of the display layer 103 may generally be 0.5–100 microns, preferably 1–50 microns. Below 0.5 micron, it is difficult to obtain sufficient contrast. On the other hand, above 100 microns, it is difficult to drive the liquid crystal device at high speed as a large driving voltage is required.

In the display layer 103, the polymer 104 constitutes a continuous matrix and the low-molecular weight mesomorphic compound 105 is dispersed therein in any shapes including spheres or spheroids or further irregularly elongated shapes like bars, inclusive of those attached to a substrate at one end thereof. A diameter of the dispersed low-molecular weight mesomorphic compound may preferably be 0.1–10 microns, more preferably 0.3–5 microns. Herein, for the shapes other than the sphere the above diameter means a diameter of a shorter axis of the dispersed low-molecular weight mesomorphic compound when approximated to a spheroid or a cylindrical bar.

In the present invention, incompatibility of the polymer 104 with a low-molecular weight mesomorphic compound 105 can be recognized as phase separation when observed through a polarizing microscope (magnification=400). The disperse phase can be identified by collecting it and measuring its phase transition temperature by a differential scanning calorimeter (DSC).

The polymer used in the present invention has a surface energy of 25 dyn/cm or below, preferably 20 dyn/cm or below, at the interface between the polymer and the low-molecular weight mesomorphic compound.

Herein, a surface energy is calculated in the following manner.

A polymer film 10 having a smooth surface is provided and water is added dropwise thereto, whereby a droplet 11 of water is formed on the surface of the polymer film. Then, a contact angle $\Theta$ is measured by a contact angle meter (e.g., CA-S150, manufactured by Kyowa Kaimen Kagaku K.K.). A surface energy of the polymer is calculated from an equation:

$$\gamma_s = \gamma_i + \gamma_1 \cos\theta$$

wherein $\gamma_s$ is a surface energy of a polymer, $\gamma_1$ is a surface energy of a liquid, and $\gamma_i$ is a interface energy between the polymer and the liquid (Fox, H. W. and Zisman W. A., "J. Colloid Soi." 5, 514 (1950)). More specifically, it is possible to replace the interface energy $\gamma_i$ with 0 in general Further the above-measured value of the contact angle $\Theta$ and the surface energy of water (72.8 dyn/cm at 20° C.) are substituted for $\Theta$ and $\gamma_1$ in the above equation to obtain a surface energy of a polymer $\gamma_s$.

Examples of the polymer having a surface energy of 25 dyn/cm or below calculated by the above method may include: polydimethylsiloxane, polytetrafluoroethylene, polyhexafluoropropylene, polychlorotrifluoroethylene, polyvinylidene fluoride, polyvinyl fluoride, and polytrifluoroethylene. These polymers may be used singly or in combination of two or more species.

The polymer used in the present invention may include a copolymer obtained through polymerization of an ordinary monomer (such as acrylate or methacrylate-type monomer) providing a higher surface energy (30 dyn/cm or above) to the resultant copolymer and a monomer capable of imparting a lower surface energy to the resultant copolymer at the interface between the copolymer and a low-molecular weight mesomorphic compound because the surface energy of the resultant copolymer is required to be 25 dyn/cm or below. In this instance, the surface energy of the copolymer can be obtained in the same manner as in the polymer described above except that a copolymer film is used instead of the polymer film.

Examples of the monomer capable of providing a lower surface energy with the copolymer may include fluorine-containing monomers and siloxane-type monomers. Specific examples of the above monomer may include those represented by the following formulas.

1H,1H,11H-icosafluoroundecyl acrylate
$$H(CF_2)_{10}CH_2OOCCH=CH_2 \quad (I-1)$$

1H,1H,11H-icosafluoroundecyl methacrylate
$$H(CF_2)_{10}CH_2OOCC(CH_3)=CH_2 \quad (I-2)$$

1H,1H-heptafluorobutyl acrylate
$$CF_3-(CF_2)_2-CH_2OOCCH=CH_2 \quad (I-3)$$

1H,1H-heptafluorobutyl methacrylate
$$CF_3-(CF_2)_2-CH_2OOCC(CH_3)=CH_2 \quad (I-4)$$

3,3,4,4,5,5,5-heptafluoropentene-1
$$C_3F_7CH=CH_2 \quad (I-5)$$

hexafluoroisopropyl methacrylate
$$(CF_3)_2CHOOCC(CH_3)=CH_2 \quad (I-6)$$

hexafluoropropylene oxide
$$CF_3CF\underset{O}{\diagdown\diagup}CF_2 \quad (I-7)$$

1H,1H,5H-octafluoropentyl methacrylate
$$H(CF_2)_4CH_2OOCC(CH_3)=CH_2 \quad (I-8)$$

1H,1H-pentadecafluorooctyl acrylate
$$C_7F_{15}CH_2OOCCH=CH_2 \quad (I-9)$$

pentafluorostyrene
$$C_6H_5CH=CH_2 \quad (I-10)$$

2,2,2-trifluoroethyl methacrylate
$$CF_3CH_2OOCC(CH_3)=CH_2 \quad (I-11)$$

3-methacryloxy-propyl-tris(trimethylsiloxy)-silane
$$(CH_3)_3Si-(CH_2)_3-OOCC(CH_3)=CH_2 \quad (I-12)$$

$$(CH_3)_3Si-(OSi(CH_3)_2)_nOSi(CH_3)-(CH_2)_3OOCC(CH_3)=CH_2 \quad (I-13)$$
$$n = 10-131$$

(Trade name: FM07-11-15, mfd. by Chisso K.K.)

The above-mentioned polymer is used in combination with a low-molecular weight mesomorphic compound which is incompatible with the polymer. The mesomorphic polymer can be used in an amount sufficient to form a continuous matrix and is generally contained in the display layer in a proportion of 10–70 wt. %, preferably 20–50 wt. %. Below 10 wt. %, it is difficult to align a low-molecular weight mesomorphic compound as the alignment-controlling effect of the mesomorphic polymer matrix is insufficient. Above 70 wt. %, it becomes difficult to obtain a large change in refractive index based on re-alignment of the low-molecular weight mesomorphic compound under application of a driving voltage, whereby the liquid crystal device cannot provide a good contrast.

Figure 5:
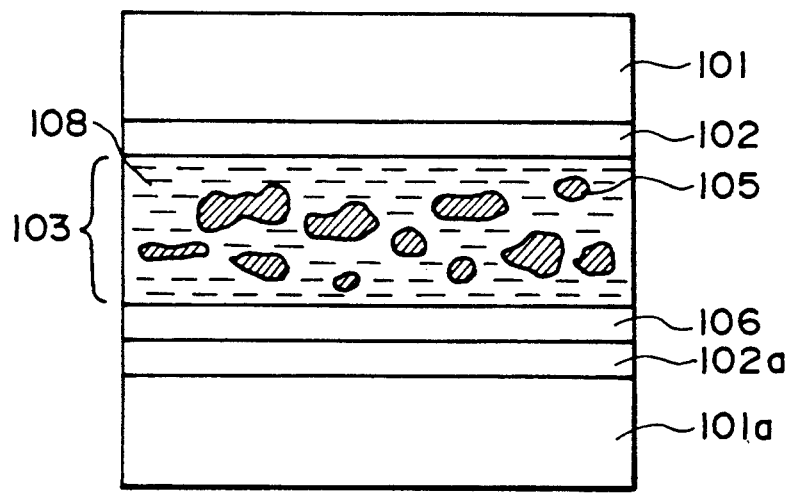
FIG. 5 is a schematic sectional view showing another embodiment of the liquid crystal device according to the present invention.

FIG. 5 is a schematic sectional view of another embodiment of the liquid crystal device of the present invention for explanation of the structure thereof.

Referring to FIG. 5, the liquid crystal device includes a display layer 103 comprising a porous film material having open pores 108 and a low-molecular weight mesomorphic compound 105 impregnating the porous film material. Substrates 101 and 101a, electrodes 102 and 102a, and an adhesive 106 are the same as described above.

The porous film material used in the present invention has a surface energy of 25 dyn/cm or below, preferably 20 dyn/cm or below at the interface between the porous film material and the low-molecular weight mesomorphic compound. Above 25 dyn/cm, a threshold voltage of the liquid crystal device is undesirably increased and hysteresis with respect to light transmittance is liable to occur.

The surface energy of the porous film material can also be calculated by the above-mentioned method. In this instance, a film obtained from the porous film material is used instead of the polymer film.

The porous film material may preferably comprise a polymer because it is easily formed into a film with a high strength. As a result, the polymer is usable for providing the display layer constituting a practical liquid crystal device.

Examples of the polymer for providing the porous film material having a surface energy of 25 dyn/cm or below may include:
poly[(1-chlorodifluoromethyl)-2-chloro-1,2,2-trifluoroethyl acrylate],
poly(1-chlorodifluoromethyl acrylate),
poly(2,2,3,3,4,4,4-heptafluorobutyl acrylate),
poly(perfluoroisobutyl acrylate),
poly[2-(N-propyl-N-heptadecafluorooctylsulfonyl)aminoethyl acrylate],
poly(2,2,3,3,4,4,5,5,6,6,7,7,8,8,8-pentadecafluorooctyl acrylate),
poly(1-trifluoromethyltetrafluoroethyl acrylate),
poly[2-(2-trifluoromethyl)tetrafluoroethoxy)ethyl acrylate],
poly[5-((1-trifluoromethyl)tetrafluoroethoxy)pentyl acrylate],
poly[11-((1-trifluoromethyl)tetrafluoroethoxy)undecyl acrylate],
poly[(1-trifluoromethyl)-2,2,2-trifluoroethyl acrylate],
poly(perfluoro-tertiarybutyl methacrylate),
poly[1-(chlorodifluoromethyl)tetrafluoroethyl methacrylate],
poly(2,2,3,3,4,4,5,5,6,6,7,7,8,8,8-pentadecafluorooctyl methacrylate),
poly(2,2,3,3-tetrafluoropropyl methacrylate), acrylate),
poly(1-trifluoromethyl-2,2,2-trifluoroethyl methacrylate),
poly[(1-trifluoromethyl)tetrafluoroethoxyethylene],
poly[(1-trifluoromethyl)tetrafluoroethoxyethylene),
poly[(1-trifluoromethyl)tetrafluoroethoxymethyl-1-methylethylene-co-maleic acid],
poly(heptafluoropropylethylene),
poly(tetrafluoroethylene),
poly(trifluoroethylene),
poly(trifluoromethylethylene),
poly(trifluoromethylethylene-co-tetrafluoroethylene),
poly(trifluoromethyltrifluoroethylene), poly(vinylidene fluoride)
poly[oxy-1,2-bis(perfluoroisobutoxymethyl)ethylene],
poly[oxy-1-(3,5-bis(trifluoromethyl)phenyl)-1-trifluoro-
 ethoxymethylethylene],
poly(oxy-1-pentafluorophenyl-1-trifluoromethyltri-
 fluoroethoxymethylethylene),
poly(oxy-1-phenyl-1-trifluoromethyl(trifluoroethox-
 ymethylethylene)),
poly(oxy-3-trifluoromethylphenoxymethylethylene),
poly[oxy-1-(3-trifluoromethyl)phenyl-1-trifluorome-
 thyltrifluoroethoxymethylethylene],
poly[(1-trifluoromethyltetrafluoroethoxymethyl) ethy-
 lene-co-maleic anhydride],
poly[1-(1-trifluoromethyltetrafluoroethoxymethyl)-1-
 methylene-co-maleic anhydride],
poly(dimethylsiloxane),
a polymer obtained from 3-fluoropropyltrimethoxysi-
 lane,
a polymer obtained from 3-(2,2,3,3,4,4,5,5,6,6,7,7,8,8,8-
 pentadecafluorooxy)propyltrimethoxysilane,
a polymer obtained from (3-(1-trifluoromethyl) tetra-
 fluoroethoxy)propyltrichlorosilane,
a polymer obtained from (3-(1-trifluoromethyl) tetra-
 fluoroethoxy)propyltrimethoxysilane,
poly[(dodecanoylimino)ethylene],
poly[(heptanoylimino)ethylene],
poly[(hexanoylimino)ethylene],
poly[(octadecanoylimino)ethylene],
poly[12,12,13,13,14,14,15,15,16,16,17,17,18,18,18-pen-
 tadecafluorooctadecanoylimino)ethylene], and
poly[(pentanoylimino)ethylene].

These polymers may be used singly or in combination of two or more species.

The porous film material may also comprise an inorganic substance such as glass or silica gel. The inorganic substance is subjected to, e.g., calcination or vapor deposition to provide a porous film material.

The above polymers may be used singly or in combination of two or more species.

Even when a porous film material has a surface energy above 25 dyn/cm, the material can be used in the present invention by treating or modifying the surface of the material with a substance having a surface energy of 25 dyn/cm or below.

Such a surface treating method may preferably include plasma treatment or plasma polymerization. For instance, a substance having a lower surface energy can be formed by supplying plasma with tetrafluorocarbon, etc. and spraying a porous film material having a surface energy above 25 dyn/cm with the tetrafluorocarbon. Further, a polymer film showing a lower surface energy can be formed on the surface of a porous film material having a higher surface energy by conducting polymerization of a monomer (e.g., tetrafluoroethylene) in a plasma state.

Examples of the porous film material having open pores which can be used for subjecting to the above surface treating method may include: Hipore 1,000, 2000, 3000, 4000 (manufactured by Asahi Kasei Kogyo K.K.); KT-50, LE-85, Duracard, Excepole (manufactured by Mitsubishi Kasei K.K.); and Celpore (manufactured by Sekisui Kasei Kogyo K.K.). However, the porous film material is not restricted to the above examples.

The porous film material used in the present invention has open pores which can communicate matter such as a solid, liquid or gas.

In the present invention, the porous film material having open pores is used in combination with a low-molecular weight mesomorphic compound incompatible therewith and can be used in an amount sufficient to form a continuous matrix. The porous film material having open pores is generally contained in the display layer in a proportion of 10–70 wt. %, preferably 10–50 wt. %.

The low-molecular weight mesomorphic compound is dispersed in the porous film material as a continuous matrix. A diameter of the low-molecular weight mesomorphic compound may preferably 0.1–10 microns, more preferably 0.5–5 microns.

Then, specific examples of the low-molecular weight mesomorphic compound used in the present invention may include those represented by the following structural formulas, which are shown below together with phase transition characteristics.

Herein, the respective symbols denote the following phases:

Cryst.: crystal,
SmC*: chiral smectic C phase,
SmA: smectic A phase,
SmB: smectic B phase,
SmC: smectic C phase,
SmE: smectic E phase,
SmF: smectic F phase,
SmG: smectic G phase,
Sm3: un-identified smectic phase,
Ch.: cholesteric phase,
N: nematic phase, and
Iso.: isotropic phase.

Chiral smectic mesomorphic compound $$\underset{*}{C_2H_5\overset{CH_3}{\underset{|}{C}H}CH_2OCO}-CH=CH-\phantom{X}\!\!\!\!\!\!\!\!\!\bigcirc\!\!\!\!\!\!\!\!\!\phantom{X}-\underset{\downarrow O}{N=N}-\phantom{X}\!\!\!\!\!\!\!\!\!\bigcirc\!\!\!\!\!\!\!\!\!\phantom{X}-CH=CH-COOCH_2\underset{*}{\overset{CH_3}{\underset{|}{C}H}}C_2H_5 \quad \text{(II-1)}$$

4,4-azoxycinnamic acid-bis(2-methylbutyl)ester

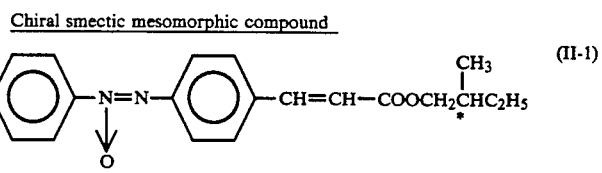

Cryst. $\underset{\longleftarrow}{\overset{121° C.}{\longrightarrow}}$ SmC* $\underset{\longleftarrow}{\overset{134° C.}{\longrightarrow}}$ SmA $\underset{\longleftarrow}{\overset{168° C.}{\longrightarrow}}$ Iso.

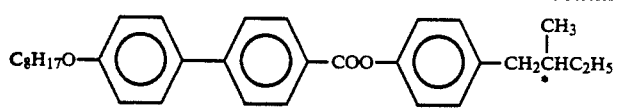
(II-2)

4-(2'-methylbutyl)phenyl-4'-octyloxybiphenyl-4-carboxylate

Cryst. $\xrightarrow{78°\ C.}$ Sm3 $\xrightarrow{80°\ C.}$ SmC* $\xrightarrow{128.3°\ C.}$ SmA $\xrightarrow{171°\ C.}$ Ch. $\xrightarrow{174.2°\ C.}$ Iso.

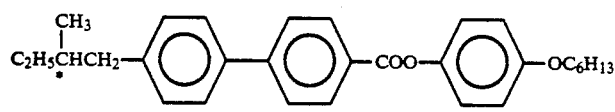
(II-3)

4-hexyloxyphenyl-4-(2''-methylbutyl)biphenyl-4'-carboxylate

Cryst. $\xrightarrow{68.8°\ C.}$ SmC* $\xrightarrow{80.2°\ C.}$ Ch. $\xrightarrow{163.5°\ C.}$ Iso.

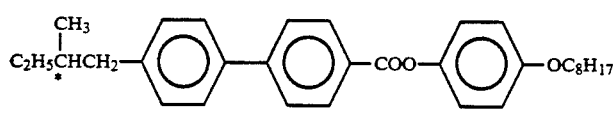
(II-4)

4-octyloxyphenyl-4-(2''-methylbutyl)biphenyl-4'-carboxylate

Cryst. $\xrightarrow{76°\ C.}$ SmC* $\xrightarrow{88.6°\ C.}$ Ch. $\xrightarrow{155.4°\ C.}$ Iso.

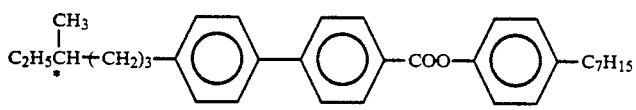
(II-5)

4-heptylphenyl-4-(4''-methylhexyl)biphenyl-4'-carboxylate

Cryst. $\xrightarrow{91.5°\ C.}$ SmC* $\xrightarrow{93°\ C.}$ SmA $\xrightarrow{112°\ C.}$ Ch. $\xrightarrow{131°\ C.}$ Iso.

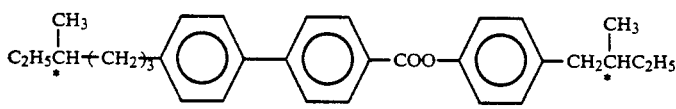
(II-6)

4-(2''-methylbutyl)phenyl-4-(4'''-methylhexyl)-biphenyl-4'-carboxylate

Cryst. $\xrightarrow{83.4°\ C.}$ Ch. $\xrightarrow{114°\ C.}$ Iso.
$\uparrow$ $\downarrow 81.0°\ C.$
SmC* $\xleftarrow{74.3°\ C.}$ SmA

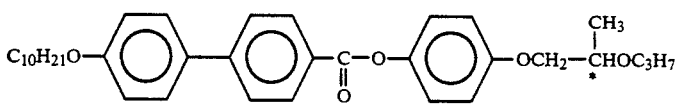
(II-7)

Cryst. $\xrightarrow{84°\ C.}$ SmC* $\xrightarrow[141°\ C.]{144°\ C.}$ SmA $\xrightarrow[159°\ C.]{162°\ C.}$ Iso.
$\uparrow$ $\downarrow 72°\ C.$
45° C. SmI

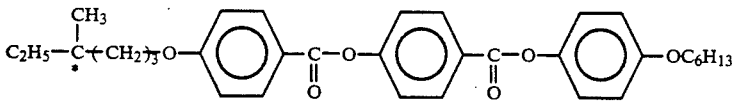
(II-8)

Cryst. $\xrightarrow[72.4°\ C.]{95.6°\ C.}$ SmC* $\xrightarrow[108°\ C.]{115°\ C.}$ Ch. $\xrightarrow[183°\ C.]{187°\ C.}$ Iso.

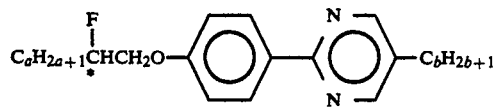

(II-9)

a = 4–12,
b = 8–16
(Case where a = 6, b = 12)

Cryst. $\xrightarrow{56° C.}$ SmC* $\xrightarrow{70° C.}$ SmA $\xrightarrow{74° C.}$ Iso.

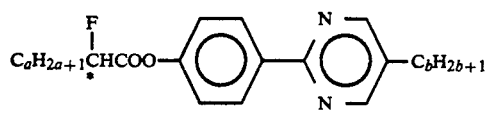

(II-10)

a = 4–12,
b = 8–16
(Case where a = 8, b = 10)

Cryst. $\xleftarrow{3° C.}$ SmC* $\xleftarrow{43° C.}$ SmA $\xleftarrow{46° C.}$ Ch. $\xleftarrow{48° C.}$ Iso.

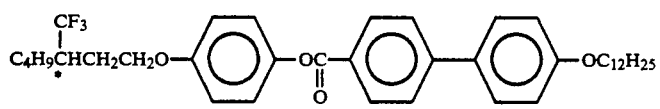

(II-11)

Cryst. $\xrightarrow{58° C.}$ SmC* $\xrightarrow{120° C.}$ SmA $\xrightarrow{146° C.}$ Iso.

Non-chiral smectic mesomorphic compound

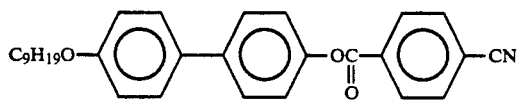

(II-12)

4'-n-nonyloxy-4-biphenylyl-4-cyanobenzoate

Iso. $\longrightarrow$ N. $\longrightarrow$ SmC

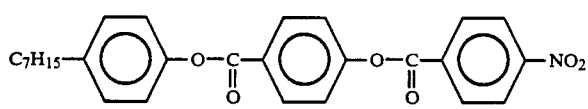

(II-13)

4-n-heptylphenyl-4-(4'-nitrobenzoyloxy)benzoate

Iso. $\longrightarrow$ N. $\longrightarrow$ SmA

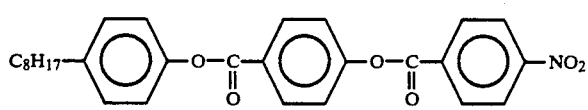

(II-14)

4-n-octylphenyl-4-(4'-nitrobenzoyloxy)benzoate

Iso. $\longrightarrow$ N. $\longrightarrow$ SmA $\longrightarrow$ SmC

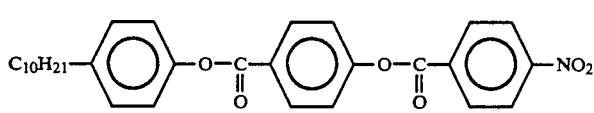

(II-15)

4-n-decylphenyl-4-(4'-nitrobenzoyloxy)benzoate

Iso. $\longrightarrow$ N. $\longrightarrow$ SmA $\longrightarrow$ SmC

-continued

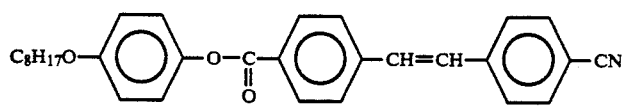
(II-16)

trans-4-(4''-octyloxybenzoyloxy)-4'-cyanostilbene

Iso. ⟶ SmA₁ ⟶ N. ⟶ SmA₂

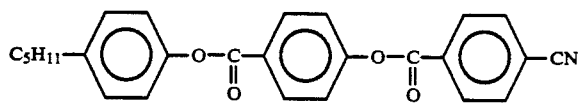
(II-17)

4-n-pentylphenyl-4-(4'-cyanobenzoyloxy)benzoate

Iso. ⟶ N. ⟶ SmA

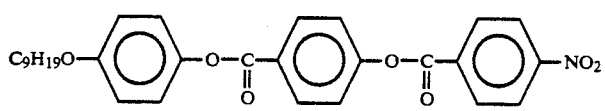
(II-18)

4-n-nonyloxyphenyl-4-(4'-nitrogenzoyloxy)benzoate

Iso. ⟶ N. ⟶ SmA ⟶ SmC

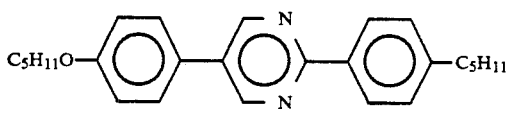
(II-19)

2-(4'-n-pentylphenyl)-5-(4''-n-pentyloxyphenyl)-pyrimidine

Iso. ⟶ SmA ⟶ SmC ⟶ SmF ⟶ SmG

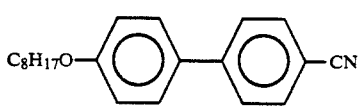
(II-20)

4-cyano-4'-n-octyloxybiphenyl

Iso. ⟶ N. ⟶ SmA

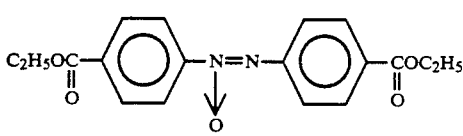
(II-21)

diethyl p,p'-azoxydibenzoate

Iso. ⟶ SmA

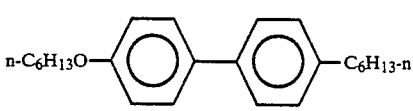
(II-22)

4-n-hexyl-4'-n-hexyloxybiphenyl

Iso. ⟶ SmB ⟶ SmE (II-23)

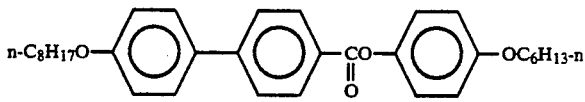

4-n-hexyloxyphenyl-4'-n-octyloxybiphenyl-4-carboxylate

Iso. ⟶ N. ⟶ SmA ⟶ SmC ⟶ SmB (II-24)

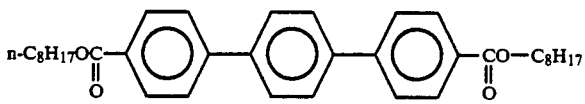

di-n-octyl-4,4''-terphenyl dicarboxylate

Iso. ⟶ SmA ⟶ SmC (II-25)

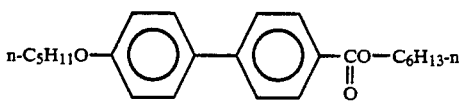

n-hexyl-4'-n-pentyloxybiphenyl-4-carboxylate

Iso. ⟶ SmA ⟶ SmB ⟶ SmE (II-26)

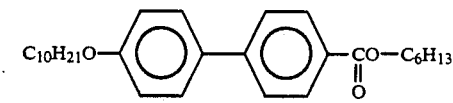

4-n-hexyl-4'-n-decyloxybiphenyl-4-carboxylate

Iso. ⟶ SmA ⟶ SmC (II-27)

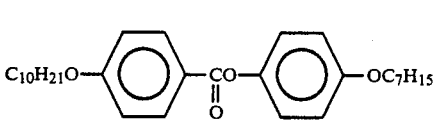

4-n-heptyloxyphenyl-4-n-decyloxybenzoate

Iso. ⟶ SmA ⟶ SmC

Nematic mesomorphic compound (or nematic liquid crystal)

(II-28)

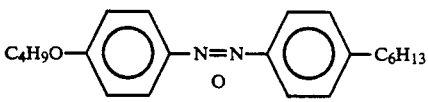

4-hexyl-4'-butyloxyazobenzene

Iso. ⇌ 90° C. N. ⇌ 27° C. Cryst.

(II-29)

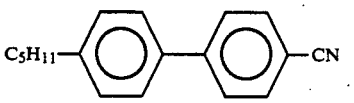

4-cyano-4'-pentylbiphenyl

Iso. ⇌ 35° C. N. ⇌ 24° C. Cryst.

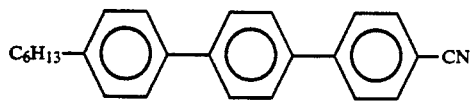

4-cyano-4'-hexylterphenyl

Iso. $\xrightleftharpoons{228° C.}$ N. $\xrightleftharpoons{125° C.}$ Cryst.

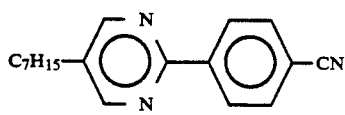 (II-31)

heptylcyanophenyl pyrimidine

Iso. $\xrightleftharpoons{50° C.}$ N. $\xrightleftharpoons{44° C.}$ Cryst.

Z-1625 (mfd. by Merck Co.) (II-32)

Nematic temperature range = −10 to 60° C.

E-7 (mfd. by BDH Co.) (II-33)

Nematic temperature range = −10 to 60° C.

R-200 (mfd. by Rosch Co.) (II-34)

Nematic temperature range = 0 to 65° C.

D-X01A (mfd. by Dainippon Ink K.K.) (II-35)

Nematic temperature range = −26 to 68° C.

ZLI-2008 (mfd. by Merck Co.) (II-36)

$T_{cl}$ (clearing point) = 64° C.

Sm $\xrightarrow{<-20° C.}$ N

ZLI-1840 (mfd. by Merck Co.) (II-37)

$T_{cl}$ = 90° C.

Sm $\xrightarrow{<-20° C.}$ N

TN403 (mfd. by Dainippon Ink K.K.) (II-38)

$T_{cl}$ = 82° C.

Sm $\xrightarrow{<-20° C.}$ N

The above-mentioned monomer capable of providing a lower surface energy with the resultant polymer or copolymer may be polymerized by various polymerization methods using a polymerization initiator.

The polymerization methods may include radical polymerization, anionic polymerization, cationic polymerization, ring-opening polymerization, and group transfer polymerization, wherein these polymerization is initiated by heating or exposure to light.

The polymerization initiator is used in proportion of 0.05–10 wt. %, preferably 0.1–5 wt. %, of a composition comprising the monomer and a low-molecular weight mesomorphic compound. Below 0.05 wt. the monomer cannot be sufficient polymerized, thus failing to provide a good polymer. Above 10 wt. %, a decomposition product of the polymerization initiator or the polymerization initiator per se can adversely affect the mesomorphism of the mesomorphic compound, thus leading to a narrower mesomorphic temperature range. The polymerization initiator may be benzoin ether-type, benzophenone-type, acetophenene-type or thioxanthone-type.

Specific examples of the polymerization initiator may include those represented by the following structural formulas or trade names.

Acylphosphinoxide (III-1)

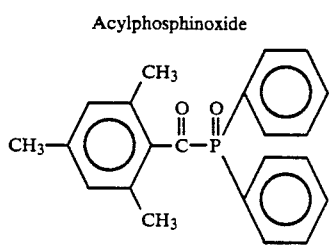

Michler's ketone (III-2)

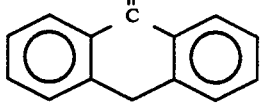

Isobutylthioxanthone (III-3)

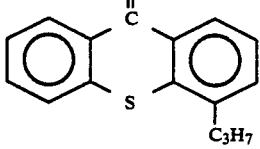

Darocur 1173 (mfd. by Merk Japan K.K.) (III-4)

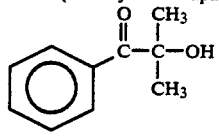

Irgacure 184 (mfd.) by Ciba-Geigy Corp.) (III-5)

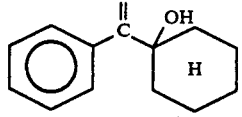

Irgacure 907 (mfd. by Ciga-Geigy Corp.) (III-6)

Irgacure 651 (mfd. by Ciga Geigy Corp.) (III-7)

Vicure 55 (mfd. by Stuaffer Chemical Co.) (III-8)

The polymerization initiator may be used together with a polymerization promoter (or accelerator) or a sensitizer.

The composition comprising the monomer and the low-molecular weight mesomorphic compound may further contain a crosslinking monomer having two or more double bond for controlling degree of polymerization and glass transition temperature (Tg) of the resultant polymer.

Specific examples of the crosslinking monomer may include those listed below:

(IV-1) trimethylolpropane triacrylate
(IV-2) pentaerythritol triacrylate
(IV-3) tripropylene glycol diacrylate
(IV-4) 1,6-hexanediol diacrylate
(IV-5) bisphenol A diglycidyl ether diacrylate
(IV-6) tetraethylene glycol diacrylate
(IV-7) hydroxypivalic acid neopentyl glycol diacrylate
(IV-8) pentaerythritol tetraacrylate
(IV-9) dipentaerythritol hexaacrylate
(IV-10) glycidyl acrylate
(IV-11) heptadecachlorodecyl acrylate
(IV-12) methacryloxypropyl trimethoxysilane In the present invention, it is preferable that an optic axis of a polymer or porous film material corresponds with that of a low-molecular weight mesomorphic compound, whereby refractive indices $n_o$ (ordinary index) and $n_e$ (extraordinary index) of the polymer or porous film material are equal (or approximately equal) to those of the low-molecular weight mesomorphic compound, respectively, to provide a display layer in a transparent state. For such a purpose, the polymer used in the present invention may comprise a mesomorphic polymer obtained from a mesomorphic monomer by polymerization.

In the present invention, the polymer or porous film material having open pores has a surface energy of 25 dyne/cm or below, whereby the low-molecular weight mesomorphic compound shows a good perpendicular orientation characteristic (i.e., mesomorphic compound molecules are oriented perpendicularly to a spherical or tubular droplet wall) in the neighborhood of the interface between the low-molecular weight mesomorphic compound and the polymer or porous film material having open pores, under no voltage application. As a result, the mesomorphic compound presumably assumes two orientation states of the perpendicular orientation and random orientation, whereby a good scattering state may be realized. When a voltage is applied, the low-molecular weight mesomorphic compound responds to the applied voltage to show a uniform orientation to a substrate, whereby a transparent state is obtained. Further, when the applied voltage is removed, the low-molecular weight mesomorphic compound quickly responds to the removal to show an original scattering state due to the good perpendicular orientation characteristic. A liquid crystal device containing a display layer using the low-molecular weight mesomorphic compound and the polymer or porous film material shows a good threshold characteristic with no hysteresis because the perpendicular orientation characteristic of the low-molecular weight mesomorphic compound is very stable.

In the present invention, it is also possible to effect display by heating with a thermal head or laser light.

Examples of laser light may include: gas lasers such as He-Ne gas laser, $Ar^{2+}$ gas laser and $N_2$ gas laser; solid-state lasers such as ruby laser, glass laser and YAG laser; and semiconductor lasers. Among these lasers, a semiconductor laser having a wavelength of 600-1600 nm, particularly 600-900 nm may preferably be used. Further, it is possible to provide a lasers having a shorter wavelength by employing a second harmonic or third harmonic of these lasers.

When the laser light is used, the liquid crystal device further comprises a light absorption layer containing a laser light-absorbing substance or comprises a display layer dispersing or dissolving therein a laser light-absorbing substance. The laser light-absorbing substance may desirably show no absorption property in the region of visible light in view of a bad influence of the substance on a display surface.

Examples of such a laser light-absorbing substance may include: azo compounds, bisazo compounds, trisazo compounds, anthraquinone compounds, naphthoquinone compounds, phthalocyanine compounds, naphthalocyanine compounds, tetrabenzoporphyrin compounds, ammonium salt compounds, diimmonium salt compounds, and metal chelate compounds.

Among the laser light-absorbing substances, a substance for use in a semiconductor laser shows an absorption property in the region of near infrared ray and is usable for a stable light-absorbing dye. Such a substance also has a good compatibility with or dispersibility in a polymer or porous film material matrix. It is possible to obtain a thermally stable guest-host type memory or display medium by mixing a light-absorbing substance showing dichroism with a polymer or porous film material.

The above-mentioned light-absorbing substances may be used singly or in combination of two or more species.

The substance may also be used in combination with another near infrared ray-absorbing dye or another dichroic dye.

Examples of such a near infrared ray-absorbing dye may include those such as cyanine, merocyanine, phthalocyanine, tetrahydrocholine, dioxazine, anthraquinone, triphenothiazine, xanthene, triphenylmethane, pyrilium, croconium, azulene and triphenylamine.

The above-mentioned light-absorbing substance is contained in the polymer or porous film material in a proportion of 0.1–20%, preferably 0.5–10%.

Figure 2A:
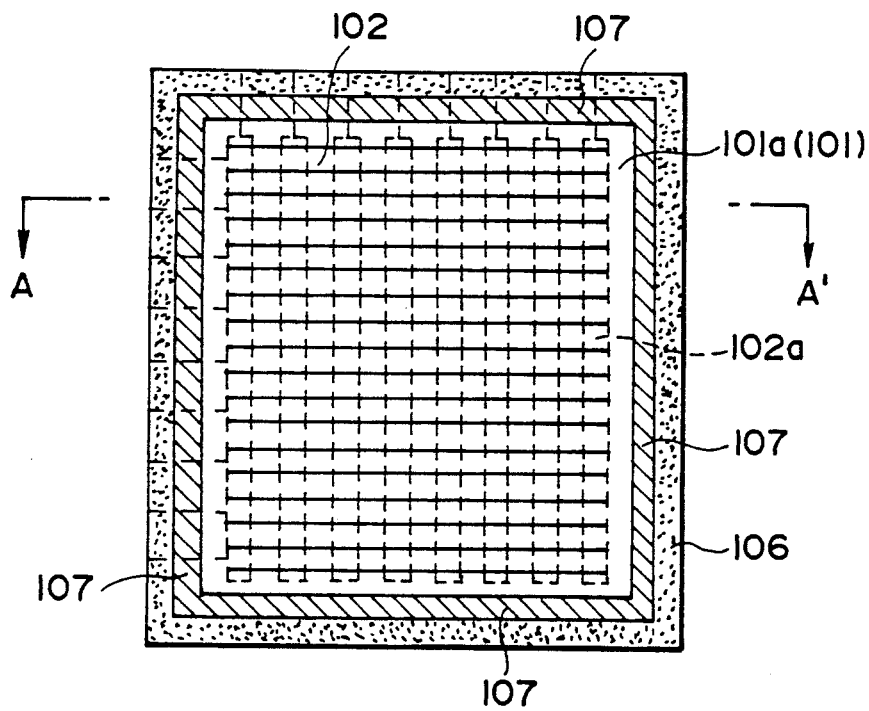
FIG. 2A is a schematic plan view of the liquid crystal device of the present invention.
Figure 2B:
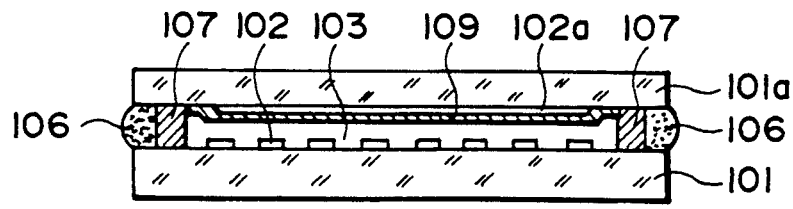
FIG. 2B is schematic A—A' line-sectional view of the device shown in FIG. 2A.
Figure 4:
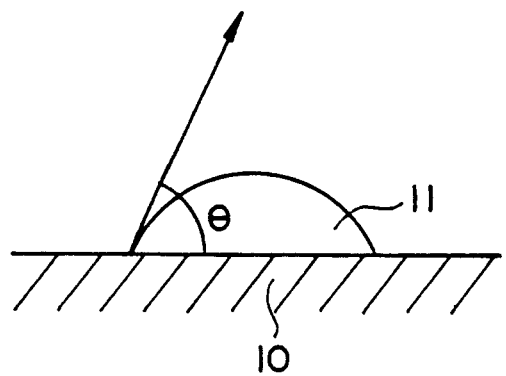
FIG. 4 is a schematic view showing a measuring method of a contact angle for calculating a surface energy of a polymer or porous film material used in the present invention.

FIGS. 2A and 2B show another structural embodiment of the liquid crystal device of the present invention, wherein FIG. 2A is a schematic plan view of the device and FIG. 2B is a schematic A-A' line-sectional view of the device.

Referring to FIGS. 2A and 2B, the liquid crystal device of the present invention includes a pair of substrates 101 and 101a (at least one of which can have birefringence or be used in combination with a polarizer) comprising a glass plate or a plastic plate and held to have a prescribed (but arbitrary) gap with a spacer 107. The periphery of the substrates 101 and 101a is sealed up with an adhesive 106 such as an epoxy resin. On the substrate 101a, plural transparent electrodes 102a (e.g., electrodes for applying scanning voltage) with a prescribed pattern, e.g., in the form of stripes, are formed. On the other hand, plural transparent electrodes 102 (e.g., electrodes for applying signal voltage) with a reflection layer perpendicular to the electrodes 102a are formed on the substrate 101.

Referring to FIG. 2B, a display layer 103 is disposed between the substrates 101 and 101a having the transparent electrodes 102 and 102a, respectively, thereon. In this embodiment, an alignment control layer 109 is formed on the transparent electrode 102a.

The alignment control layer 109 formed on the substrate 101a with the electrode 102a thereon may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. The alignment control layer 109 and may be formed by rubbing a film of the inorganic or organic material described above with velvet, cloth or paper in one direction so as to provide a uniaxial alignment characteristic. Further, it is possible to compose the alignment control layer of two layers, e.g., by first forming a layer of the inorganic material and forming thereon a layer of an organic material. In a preferred embodiment, it is possible to form an alignment control layer on a substrate by oblique vapor deposition with the inorganic material such as SiO or $SiO_2$. It is also possible to impart an alignment-controlling effect to a substrate such as one comprising glass or plastic by effecting oblique etching after providing an inorganic or organic material on the substrate. The use of the alignment control layer is effective for uniformly aligning the polymer in one direction.

The alignment control layer 109 may preferably be used also as an insulating layer. Accordingly, the thickness of the alignment control layer may generally have 100 Å–1 micron, preferably 500–5000 Å. The insulating layer also has the advantage of preventing current conduction due to a trace impurity in the display layer 103, whereby the display layer little deteriorate even in a repetitive operation. In the present invention, the alignment control layers may be formed on the transparent electrodes 102 and 102a, respectively.

The reflection layer used in the present invention may include a metal films comprising a metal such as Al, Au or Ag and a dielectric mirror. The thickness of the reflection layer may generally be 0.01–100 microns, preferably 0.05–10 microns.

The display apparatus of the present invention includes the above-mentioned liquid crystal device, means for emitting light, means for applying voltage to the device, and means for separating the light into transmitted light and scattered light.

FIG. 3 shows an explanatory view of an embodiment of the display apparatus of the present invention. The display apparatus is a full-color projection-type display apparatus employing a schlieren optical system.

Referring to FIG. 3, white light emitted by a light source unit 301 is separated into three primary colors of R (red), G (green) and B (blue) to be incident to liquid crystal devices 303, 303a and 303b after passing through schlieren lenses 308, 308a and 308b. At this time, the liquid crystal devices 303, 303a and 303b are supplied with voltage by a driving unit 307 for driving the liquid crystal devices. The liquid crystal devices in this embodiment can employ a simple matrix system or a non-linear optical device, but may more preferably be a type comprising a thin film transistor (TFT) as a switch for each picture element in view of display contrast, response speed and gradation display. A non-selected picture element in the device is turned into a white scattering state for scattering the incident light and a selected picture element is allowed to transmit the incident light. When the transmitted light fluxes and the scattered light fluxes are separated by schlieren optical systems 304, 304a and 304b, it is possible to obtain a good display having a contrast as high as 100. The transmitted light fluxes are combined by a dichloic prism 305 to be projected onto a screen (not shown) through a projection lens 306, whereby good full-color images can be obtained.

The display device of the present invention is illuminated with light, so that display is effected by employing the resultant scattered light. More specifically, an electric field is applied to the display layer in the liquid crystal device, whereby the low-molecular weight mesomorphic compound responds to the electric field to show a uniform alignment state which is different from that in the absence of the electric field, thereby to provide a difference in scattering degree of the incident light before and under the electric field application. The display method of the present invention utilizes the difference in scattering degree of the scattered light for effecting display.

Hereinbelow, the present invention will be explained in more detail with reference to Examples.

EXAMPLE 1

A composition was prepared by mixing the following ingredients in the indicated proportions.

| Ingredients | wt.part(s) |
| --- | --- |
| Monomer (I-1) (manufactured by PCR Co.) | 1 |
| Kayarad TPA-320 (mfd. by Nippon Kayaku K.K.) | 2 |
| Irgacure 651 (mfd. by Ciba-Geigy Corp.) | 0.02 |

The above composition was applied onto a 1.1 mm-thick glass plate by means of a bar coater and was subjected to irradiation with ultraviolet rays from a high-pressure mercury lamp (power=40 W, irradiation distance=30 cm) under $N_2$ gas stream to effect polymerization, whereby a polymer film was obtained.

A droplet of water was added dropwise to the polymer film and was subjected to measurement of a contact angle (Θ) with a contact angle meter (CA-150, mfd. by Kyowa Kaimen Kagaku K.K.), whereby a contact angle of 75 degrees at 20° C. was obtained to provide a surface energy of 19 dyn/cm.

EXAMPLE 2

A blank cell for forming a display layer comprising a low-molecular weight mesomorphic compound (or liquid crystal) and a polymer was prepared as follows.

A 1.1 mm-thick substrate comprising a green glass (available from Matsuzaki Sinku K.K.) having thereon a vapor-deposited layer comprising a 1000 Å-thick ITO and a 500 Å-thick $SiO_2$ was prepared.

After silica beads as spacers (SW 8.6 μm, available from Shokubai Kasei Kogyo K.K.) with an average particle size of 8.6 microns were dispersed on the above substrate, another substrate treated in the same manner as above except for silica beads treatment was superposed on the above-treated substrate, followed by sealing of the periphery thereof with an adhesive (Stract Bond, EH-454NF, mfd. by Mitsui Toatu Kagaku K.K.).

Into the above-prepared cell, a composition for providing a display layer comprising 6 wt. parts of a low-molecular weight nematic liquid crystal (Example Compound II-33) (E-7, mfd. by BDH Co.), 0.5 part of a monomer (I-1) used in Example 1, 1 wt. part of Kayarad TPA-320 used in Example 1 and 0.01 wt. part of a photopolymerization initiator (Irgacure 651, mfd. bY Ciba-Geigy Corp.) used in Example 1 were injected by using a capillary-rise method.

The above cell was exposed to a high-pressure mercury lamp (power=40 W; irradiation distance=30 cm), thus conducting polymerization until a haze of the display layer became a certain value. The liquid crystal device was subjected to measurement of a haze by a haze meter (Color and Color Difference Meter Model 1001 DP, available from Nippon Denshoku Kogyo K.K.), whereby a haze of 70% was obtained to provide a good scattering state.

EXAMPLE 3

The liquid crystal device prepared in Example 2 was subjected to voltage application 100 Hz, 5 V), whereby a haze of 21% was measured by the hazemeter. When the applied voltage was increased to 20 V, the low-molecular weight liquid crystal portion entirely responded to the voltage to show a haze of 6%. Further, when the voltage was decreased to 5 V, the haze was lowered to 20%, thus showing a good response characteristic substantially free from hysteresis and further showing a good reproducibility thereof even in a repetitive voltage application test.

The display apparatus shown in FIG. 3 was prepared by employing the above liquid crystal devices, whereby a contrast of 20:1 was obtained.

Then, one of the substrates constituting the device was removed and the remaining device was dipped into methanol, whereby the low-molecular weight liquid crystal forming a dispersed phase was extracted from the display layer of the device. When the above-treated surface of the display layer was observed through a scanning electron microscope (SEM), traces of the dispersed phase had an average diameter of 0.7-5 microns.

COMPARATIVE EXAMPLE 1

A polymerizable monomer composition was prepared by mixing the following ingredients in the indicated proportions.

| Ingredients | wt.part(s) |
| --- | --- |
| TPA-330 (mfd. by Nippon Kayaku K.K.) | 6 |
| M-117 (mfd. by Toa Gosei K.K.) | 4 |
| 2-methyl-1-phenyl-propane-1-one | 0.2 |

The above-prepared composition was used for preparing a polymer film and subjected to measurement of a contact angle in the same manner as in Example 1, whereby a contact angle of 62 degrees at 20° C. was obtained to provide a surface energy of 35 dyn/cm.

COMPARATIVE EXAMPLE 2

A mixture of a polymerizable monomer composition and a low-molecular weight mesomorphic compound was prepared by mixing the following ingredients in the indicated proportions.

| Ingredients | wt.part(s) |
| --- | --- |
| TPA-330 (mfd. by Nippon Kayaku K.K.) | 6 |
| M-117 (mfd. by Toa Gosei K.K.) | 4 |
| 2-methyl-1-phenyl-propane-1-one | 0.2 |
| ZLI-2008 (mfd. by E. Merck Co. (Ex. Comp. No. II-36) | 40 |

The above-prepared mixture was injected into a cell formed by applying a pair of glass substrates each having thereon a 2000 Å-thick ITO to each other with an adhesive containing glass fiber specers (10 μmφ, mfd. by Nippon Denki Garasu K.K.), followed by polymerization in the same manner as in Example 2 to prepare a liquid crystal device.

The liquid crystal device was subjected to pulse voltage application (rectangular waveform of 60 Hz and ±50 V), whereby the display layer changed from a scattering state (under no voltage application) into a transparent state to provide a contrast of 8:1. Further, a threshold voltage (a minimum voltage required for changing the display layer into a scattering state) was 13 V (1.3 V/μm) at 25° C. When an applied voltage was changed upward and downward, a difference between the upward voltage and downward voltage at a transmittance of 50% was 6 V. The difference of 6 V was caused by hysteresis.

Further, the above liquid crystal device was subjected to 100 hours of standing at 120° C., whereby a contrast was decreased to 3:1 and a threshold was increased to 21.5 V (2.2 V/μm) at 25° C., thus failing to provide a good stability or durability.

EXAMPLE 4

A composition was prepared by mixing the following ingredients in the indicated proportions.

| Ingredients | wt.part(s) |
|---|---|
| Monomer (I-6) (manufactured by PCR Co.) | 2 |
| Kayarad TPA-320 (mfd. by Nippon Kayaku K.K.) | 3 |
| Irgacure 651 (mfd. by Ciba-Geigy Corp.) | 0.04 |

The above composition was applied onto a 1.1 mm-thick glass plate by means of a bar coater and was subjected to irradiation with ultraviolet rays from a high-pressure mercury lamp (power=40 W, irradiation distance=30 cm) under $N_2$ gas stream to effect polymerization, whereby a polymer film was obtained.

A droplet of water was added dropwise to the polymer film and was subjected to measurement of a contact angle (Θ) with a contact angle meter (CA-150, mfd. by Kyowa Kaimen Kagaku K.K.), whereby a contact angle of 73 degrees at 20° C. was obtained to provide a surface energy of 21 dyn/cm.

EXAMPLE 5

A blank cell for forming a display layer comprising a low-molecular weight mesomorphic compound (or liquid crystal) and a polymer was prepared as follows.

A 1.1 mm-thick substrate comprising a green glass (available from Matsuzaki Sinku K.K.) having thereon a vapor-deposited layer comprising a 1000 Å-thick ITO and a 500 Å-thick $SiO_2$ was prepared.

After silica beads as spacers (SW 8.6 μm, available from Shokubai Kasei Kogyo K.K.) with an average particle size of 8.6 microns were dispersed on the above substrate, another substrate treated in the same manner as above except for silica beads treatment was superposed on the above-treated substrate, followed by sealing of the periphery thereof with an adhesive (Stract Bond, EH-454NF, mfd. by Mitsui Toatu Kagaku K.K.).

Into the above-prepared cell, a composition for providing a display layer comprising 6 wt. parts of a low-molecular weight nematic liquid crystal (Example Compound II-33) (E-7, mfd. by BDH Co.), 1 part of a monomer (I-6) used in Example 1, 1.5 wt. parts of Kayarad TPA-320 used in Example 1 and 0.02 wt. part of a photopolymerization initiator (Irgacure 651, mfd. by Ciba-Geigy Corp.) used in Example 1 were injected by using a capillary-rise method.

The above cell was exposed to a high-pressure mercury lamp (power=40 W; irradiation distance=30 cm), thus conducting polymerization until a haze of the display layer became a certain value. The liquid crystal device was subjected to measurement of a haze by a haze meter (Color and Color Difference Meter Model 1001 DP, available from Nippon Denshoku Kogyo K.K.), whereby a haze of 66% was obtained to provide a good scattering state.

The liquid crystal device prepared in Example 5 was subjected to voltage application 100 Hz, 10 V), whereby a haze of 32% was measured by the hazemeter. When the applied voltage was increased to 30 V, the low-molecular weight liquid crystal portion entirely responded to the voltage to show a haze of 8%. Further, when the voltage was decreased to 10 V, the haze was lowered to 29%, thus showing a good response characteristic substantially free from hysteresis and further showing a good reproducibility thereof even in a repetitive voltage application test.

EXAMPLE 7

A porous-film material having a thickness of 100 microns (HIPORE 2000, mfd. by Asahi Kasei Kogyo K.K.) was applied to a glass substrate having thereon a vapor-deposited 1000 Å-thick ITO electrode by using an epoxy-type adhesive. The above-prepared substrate was installed in a plasma vapor deposition apparatus (ULVAC EBX-10D, mfd. by Nippon Sinkuu Gijutsu K.K.) and subjected to plasma treatment (power=100 W, pressure=0.05 Torr) with $CF_4$ for 30 minutes.

Separately, a 100 micron-thick polypropylene film was subjected to plasma treatment in the same manner as in the above substrate and then was subjected to measurement of a contact angle in the same manner as in Example 1, whereby a contact angle was obtained to provide a surface energy of 10 dyn/cm.

EXAMPLE 8

A porous-film material having a thickness of 23 microns (EXCEPOLE E BSP BX-4, mfd. by Mitsubishi Kasei K.K.) was applied to a glass substrate having thereon a vapor-deposited 1000 Å-thick ITO electrode by using an epoxy-type adhesive. The above-prepared substrate was installed in a plasma vapor deposition apparatus (ULVAC EBX-10D, mfd. by Nippon Sinkuu Gijutsu K.K.) and subjected to plasma polymerization (power=30 W, pressure=0.05 Torr) with for 30 minutes with tetrafluoroethylene.

Separately, a 100 micron-thick polypropylene film was subjected to plasma treatment in the same manner as in the above substrate and then was subjected to measurement of a contact angle in the same manner as in Example 1, whereby a contact angle was obtained to provide a surface energy of 18 dyn/cm.

EXAMPLE 9

The plasma-treated substrate prepared in Example 7 was applied to a glass substrate having an ITO electrode, followed by sealing of the periphery thereof with an epoxy-type adhesive so as to leave a open side, whereby a liquid crystal cell was prepared. The open side of the cell was dipped in a nematic liquid crystal (ZLI-2008 (Ex. Comp. No. II-36), mfd. by Merck Co.) under reduced pressure, followed by restoration to normal pressure to effect impregnation of a low-molecular weight mesomorphic compound (II-36), whereby a liquid crystal device was prepared.

When the above-prepared liquid crystal device was subjected to pulse voltage application (rectangular waveform of 60 Hz and ±200 V), the low-molecular weight mesomorphic compound responds to the applied voltage to provide a scattering state. A response time was 500 μs. Then, the voltage was removed, whereby the low-molecular weight mesomorphic compound was restored to an original scattering state. At this time, a response time was 400 μs.

Further, the liquid crystal device provided a contrast of 10:1 and threshold voltages of 88 V at 10° C. and 81 V at 30° C. to show a good display characteristic and a stable driving characteristic.

When the liquid crystal device was subjected to upward and downward voltage application between ±100 V and ±500 V, no hysteresis was observed.

EXAMPLE 10

The substrate having been subjected to plasma polymerization prepared in Example 8 was applied to a glass substrate having an ITO electrode, followed by sealing of the periphery thereof with an epoxy-type adhesive so as to leave a open side, whereby a liquid crystal cell was prepared. The open side of the cell was dipped in a nematic liquid crystal (ZLI-2008 (Ex. Comp. No. II-36), mfd. by Merck Co.) under reduced pressure, followed by restration to normal pressure to effect impregnation of a low-molecular weight mesomorphic compound (II-36), whereby a liquid crystal device was prepared.

When the above-prepared liquid crystal device was subjected to pulse voltage application (rectangular waveform of 60 Hz and ±70 V), the low-molecular weight mesomorphic compound responds to the applied voltage to provide a scattering state. A response time was 600 µs. Then, the voltage was removed, whereby the low-molecular weight mesomorphic compound was restored to an original scattering state. At this time, a response time was 350 µs.

Further, the liquid crystal device provided a contrast of 6:1 and threshold voltages of 35 V at 10 ° C. and 30 V at 30° C. to show a good display characteristic and a stable driving characteristic.

When the liquid crystal device was subjected to upward and downward voltage application between ±50 V and ±150 V, no hysteresis was observed.

Then, a display apparatus shown in FIG. 3 was prepared by using a liquid crystal device in the same manner as in the above device except that a 10 micron-thick display layer and an active matrix substrate having picture elements connected to thin film transistors (TFT) were used. When the apparatus was driven, a contrast of 10:1 was obtained to provide good images on a screen.

As described above, according to the present invention, there are provided a liquid crystal device and display apparatus which provide a large picture area and good display with a high contrast, a good threshold characteristic and no hysteresis. Further, the device and apparatus of the present invention provide a higher response speed and an improved temperature-dependence of a threshold voltage.

What is claimed is:

1. A display apparatus, comprising: a liquid crystal device for converting light incident to said device into transmitted light and scattered light, means for emitting said light, means for applying voltage to said device, and means for separating the transmitted light and the scattered light, said device further comprising: a pair of electrode plates and a display layer disposed therebetween comprising a polymer having a surface energy of 25 dyn/cm or below and a low-molecular weight mesomorphic compound incompatible with said polymer.

2. A display method, comprising the steps of:
   selecting a liquid crystal device comprising a pair of electrode plates and a display layer disposed therebetween, said display layer comprising a polymer having a surface energy of at most 25 dyn/cm and a low-molecular weight mesomorphic compound incompatible with said polymer;
   illuminating said liquid crystal device with light; and
   effecting display by separating said light into transmitted light and scattered light.

3. A method, according to claim 2, wherein an electric field is applied to said liquid crystal device to cause an electric field response of said low-molecular weight mesomorphic compound, which response results in a difference in scattering degree of said scattered light.

4. A display apparatus, comprising: a liquid crystal device for converting light incident to said device into transmitted light and scattered light, means for emitting said light, means for applying voltage to said device, and means for separating the transmitted light and the scattered light, said device further comprising: a pair of electrode plates and a display layer disposed therebetween comprising a porous film material having open pores and a low-molecular weight mesomorphic compound impregnating said porous film material, wherein said porous film material has a surface energy of 25 dyn/cm or below and is incompatible with said low-molecular weight mesomorphic compound.

5. A display method, comprising the steps of:
   selecting a liquid crystal device comprising a pair of electrode plates and a display layer disposed therebetween, said display layer comprising a porous film material having open pores and a low-molecular weight mesomorphic compound impregnating said porous film material, wherein said porous film material has a surface energy of at most 25 dyn/cm and is incompatible with said low-molecular weight mesomorphic compound;
   illuminating said liquid crystal device with light; and
   effecting display by separating said light into transmitted light and scattered light.

6. A method, according to claim 5, wherein an electric field is applied to said liquid crystal device to cause an electric field response of said low-molecular weight mesomorphic compound, which response results in a difference in scattering degree of said scattered light.

* * * * *

UNITED STATES PATENT AND TRADEMARK OFFICE
CERTIFICATE OF CORRECTION

PATENT NO. : 5,268,783
DATED : December 7, 1993
INVENTOR(S) : KAZUO YOSHINAGA, ET AL.

It is certified that error appears in the above-indentified patent and that said Letters Patent is hereby corrected as shown below:

COLUMN 1

Line 22, "product" should read --produce--.

COLUMN 2

Line 3, "utilizes" should read --utilize--.
Line 9, "Providing" should read --providing--.
Line 50, "anyone" should read --any--.
Line 51, "device" should read --devices--.

COLUMN 3

Line 34, ""Myler"," should read --"Mylar",--.

COLUMN 4

Line 43, "Soi,"" should read --Sci,"--.
Line 45, "general" should read --general.--.

COLUMN 5

Line 6, "monomer" should read --monomers--.

COLUMN 8

Line 35, "preferably" should read --preferably be--.

COLUMN 17

Line 56, "these" should be deleted.
Line 62, "sufficient" should read --sufficiently,--.

UNITED STATES PATENT AND TRADEMARK OFFICE
CERTIFICATE OF CORRECTION

PATENT NO. : 5,268,783
DATED : December 7, 1993
INVENTOR(S) : KAZUO YOSHINAGA, ET AL.

It is certified that error appears in the above-indentified patent and that said Letters Patent is hereby corrected as shown below:

COLUMN 18

Line 1, insert: --(II-30)--.

COLUMN 19

Line 30, "Ciga-Geigy" should read --Ciba-Geigy--.
Line 32, "Ciga-Geigy" should read --Ciba-Geigy--.
Line 58, "methacryloxypropyl" should read
  -- $\gamma$-methacryloxypropyl--.

COLUMN 22

Line 5, "little deteriorate" should read --deteriorates little--.
Line 10, "a metal films" should read --metal films--.

COLUMN 23

Line 45, "bY" should read --by--.

COLUMN 24

Line 49, "specers" should read --spacers--.

UNITED STATES PATENT AND TRADEMARK OFFICE
CERTIFICATE OF CORRECTION

PATENT NO. : 5,268,783
DATED : December 7, 1993
INVENTOR(S) : KAZUO YOSHINAGA, ET AL.

It is certified that error appears in the above-indentified patent and that said Letters Patent is hereby corrected as shown below:

<u>COLUMN 26</u>

Line 47, "a" should read --an--.

Signed and Sealed this

Twenty-third Day of August, 1994

Attest:

BRUCE LEHMAN

*Attesting Officer*    *Commissioner of Patents and Trademarks*